US012768470B2

(12) United States Patent
Kitchens et al.

(10) Patent No.: US 12,768,470 B2
(45) Date of Patent: Oct. 20, 2026

(54) VALVE WITH LOAD CELL

(71) Applicant: Bray International, Inc., Houston, TX (US)

(72) Inventors: Michael Kitchens, Houston, TX (US); Jim Schmidt, Houston, TX (US); Brindesh Dhruva, Katy, TX (US); Jason Dalenberg, Houston, TX (US)

(73) Assignee: Bray International, Inc., Houston, TX (US)

( * ) Notice: Subject to any disclaimer, the term of this patent is extended or adjusted under 35 U.S.C. 154(b) by 22 days.

(21) Appl. No.: 18/749,900

(22) Filed: Jun. 21, 2024

(65) Prior Publication Data

US 2024/0344632 A1 Oct. 17, 2024

Related U.S. Application Data

(63) Continuation of application No. 17/139,284, filed on Dec. 31, 2020, now Pat. No. 12,018,772.

(Continued)

(51) Int. Cl.
*F16K 41/02* (2006.01)
*F16J 15/18* (2006.01)
*F16K 51/00* (2006.01)

(52) U.S. Cl.
CPC ............ *F16K 41/02* (2013.01); *F16J 15/185* (2013.01); *F16K 51/00* (2013.01)

(58) Field of Classification Search
CPC ...... F16J 15/184; F16J 15/185; F16J 15/3296; F16K 1/2268; F16K 37/004; F16K 141/02; F16K 41/026; F16K 51/00
See application file for complete search history.

(56) References Cited

U.S. PATENT DOCUMENTS

| | | | | |
|---|---|---|---|---|
| 4,759,224 A * | 7/1988 | Charbonneau ...... | F16K 37/0083 73/862.27 |
| 9,067,766 B1 * | 6/2015 | Bateman ............... | B66C 15/065 |

(Continued)

FOREIGN PATENT DOCUMENTS

| | | |
|---|---|---|
| CN | 203502409 U | 3/2014 |
| CN | 204164482 U | 2/2015 |

(Continued)

OTHER PUBLICATIONS

Lanel, Francois-Boris, Communication Pursuant to Article 94(3) EPC for EP 20 848 922.9-1015, Apr. 25, 2024, 5 pages, European Patent Office, Rijswijk, Netherlands.

(Continued)

*Primary Examiner* — Vincent H Tran
(74) *Attorney, Agent, or Firm* — Oathout Law Firm; Laura Tu; Mark A. Oathout

(57) ABSTRACT

The embodiments disclosed herein relate to a method for preserving the integrity of a packing and the integrity a stem of a valve, having the steps of providing a gland ring mounted above the packing surrounding the stem; providing a gland retainer mounted above the gland ring, wherein the gland retainer is secured to the valve with one or more fasteners, wherein the gland retainer is a load cell; sensing a compressional force between a top surface and a bottom surface of the gland retainer; converting the sensed each compressional force into a data point; and transmitting the data point to a computing unit.

11 Claims, 7 Drawing Sheets

Related U.S. Application Data

(60) Provisional application No. 62/956,774, filed on Jan. 3, 2020.

(56) References Cited

U.S. PATENT DOCUMENTS

| | | | | |
|---|---|---|---|---|
| 9,188,242 | B2 * | 11/2015 | Giove | F16J 15/181 |
| 2003/0033886 | A1 * | 2/2003 | Davie | F16K 41/02<br>73/780 |
| 2011/0028227 | A1 * | 2/2011 | Dubois | A63G 21/18<br>472/117 |
| 2011/0083746 | A1 * | 4/2011 | Hoang | F16K 37/0091<br>137/511 |
| 2022/0034416 | A1 * | 2/2022 | Roald | F16K 15/063 |

FOREIGN PATENT DOCUMENTS

| | | | | |
|---|---|---|---|---|
| JP | 2019056451 | A | 4/2019 | |
| WO | WO-2014032812 | A1 * | 3/2014 | G01M 3/2876 |

OTHER PUBLICATIONS

Ribeiro De Souza, Allan, Brazil search report for BR112022013256-5, Nov. 14, 2023, 4 pages, Brazil Patent Office, Rio de Janeiro, Brazil.

China National Intellectual Property Administration, Notice of Second Examination Opinion for 202080091637.X, Aug. 21, 2025, 6 pages, China Intellectual Property Administration, Beijing, China.

Lanel, Francois-Boris, Communication pursuant to 94(3) EPC for EP 20 848 922.9-1015, Feb. 3, 2025, 4 pages, European Patent Office, Rijswijk, The Netherlands.

Ding Jiaqi, First review opinion notice for CN202080091637.X, Feb. 22, 2025, 8 pages, China State Intellectual Property Office, Beijing, China.

Ding Jiaqi, Search Report for CN202080091637.X, Feb. 19, 2025, 2 pages, China State Intellectual Property Office, Beijing, China.

Prakash, Kumar Pranav, Examination report under sections 12 & 13 of the Patents Act, 1970 and the Patents Rules, 2003 for IN 202227043031, Jul. 20, 2026, 9 pages, Intellectual Property India, Mumbai, India.

* cited by examiner

VALVE WITH LOAD CELL

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field

The subject matter generally relates to apparatus and techniques for monitoring and managing industrial process control systems, in particular the underlying valves and actuators. The subject matter further relates to predictive analysis based on the monitored characteristics, in particular monitoring compression forces of the valve stem and packing elements and monitoring potential emissions or leaks in the underlying valves of industrial process control systems.

The overall performance of the process of the industrial process control system can be characterized by monitoring key metrics tied to the process. Key metrics can be measured both directly and indirectly with advantages and disadvantages inherent to both techniques. Indirect measurements are conventionally used in attempt to obtain empirical data through a process of deduction. As an example, actuator operating torque on an electric actuator can be deduced by monitoring the motor current. Valve wear can be deduced by obtaining a baseline vibration measurement by comparing this measurement to vibration overtime. Direct measurement techniques are the most desirable but also the most impractical and have not thus far been successfully commercially implemented in practice. The challenges when monitoring key metrics of a control valve include the placement of the sensors, providing power to the sensors, and processing data from the sensors. Therefore, a need exists for an apparatus and a technique that can provide direct measurement of key metrics, such as, by way of example the acting pressure against the stem packing or packing integrity and the presence of emissions, that have been conventionally very difficult to obtain and measure given the physical constraints of a control valve. Additionally, the Applicant hereby incorporates by reference the following in their entireties: U.S. Provisional Application No. 62/744,793 filed Oct. 12, 2018; and U.S. Nonprovisional application Ser. No. 16/600,864 filed Oct. 14, 2019.

BRIEF SUMMARY

The embodiments disclosed herein relate to a method for preserving the integrity of a packing and the integrity a stem of a valve, having the steps of providing a gland ring mounted above the packing surrounding the stem; providing a gland retainer mounted above the gland ring, wherein the gland retainer is secured to the valve with one or more fasteners, wherein the gland retainer is a load cell; sensing a compressional force between a top surface and a bottom surface of the gland retainer; converting the sensed each compressional force into a data point; and transmitting the data point to a computing unit.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
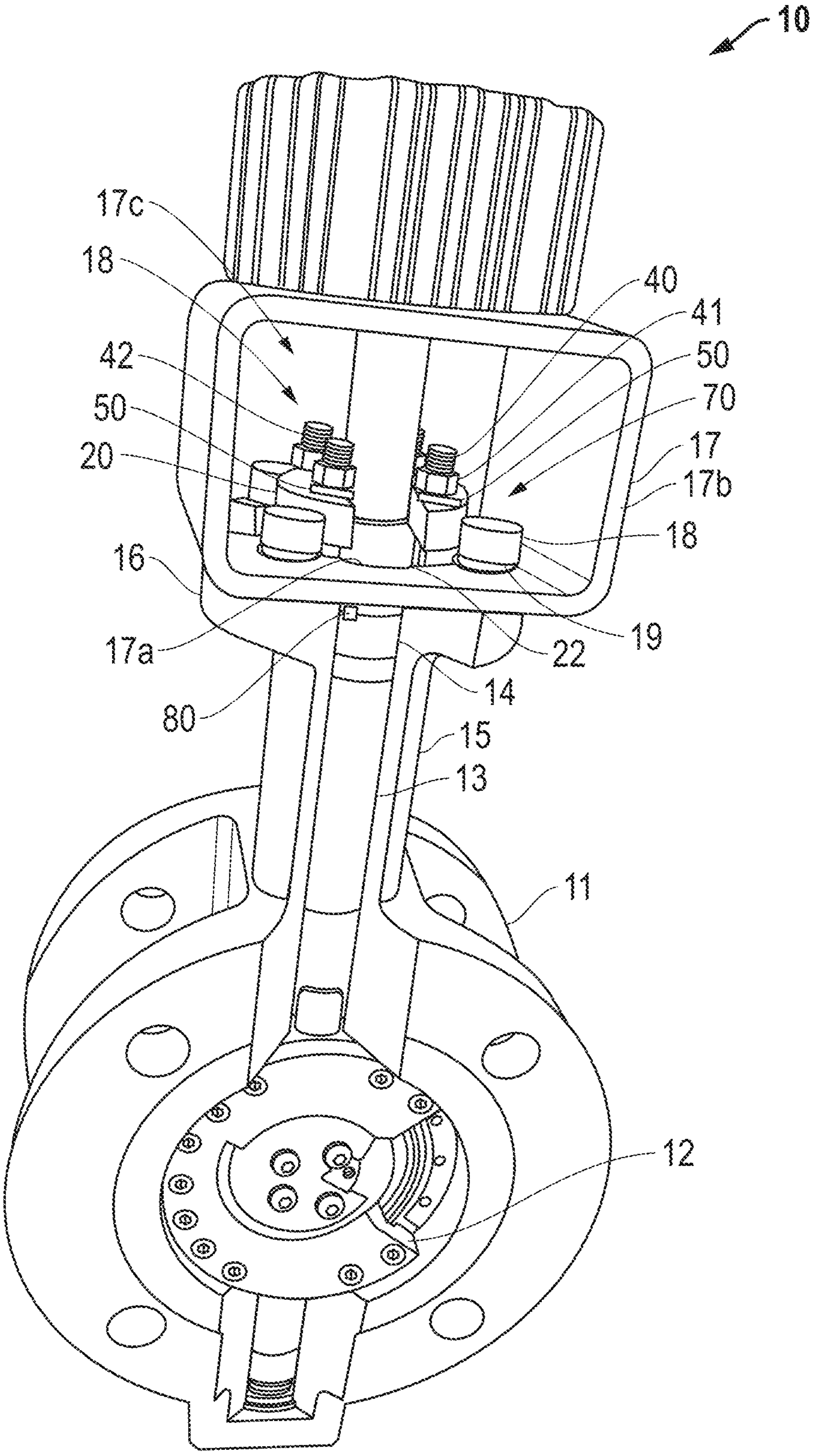
FIG. 1 depicts a partially cut away view of an exemplary embodiment of a valve having one or more load cells.
Figure 2:
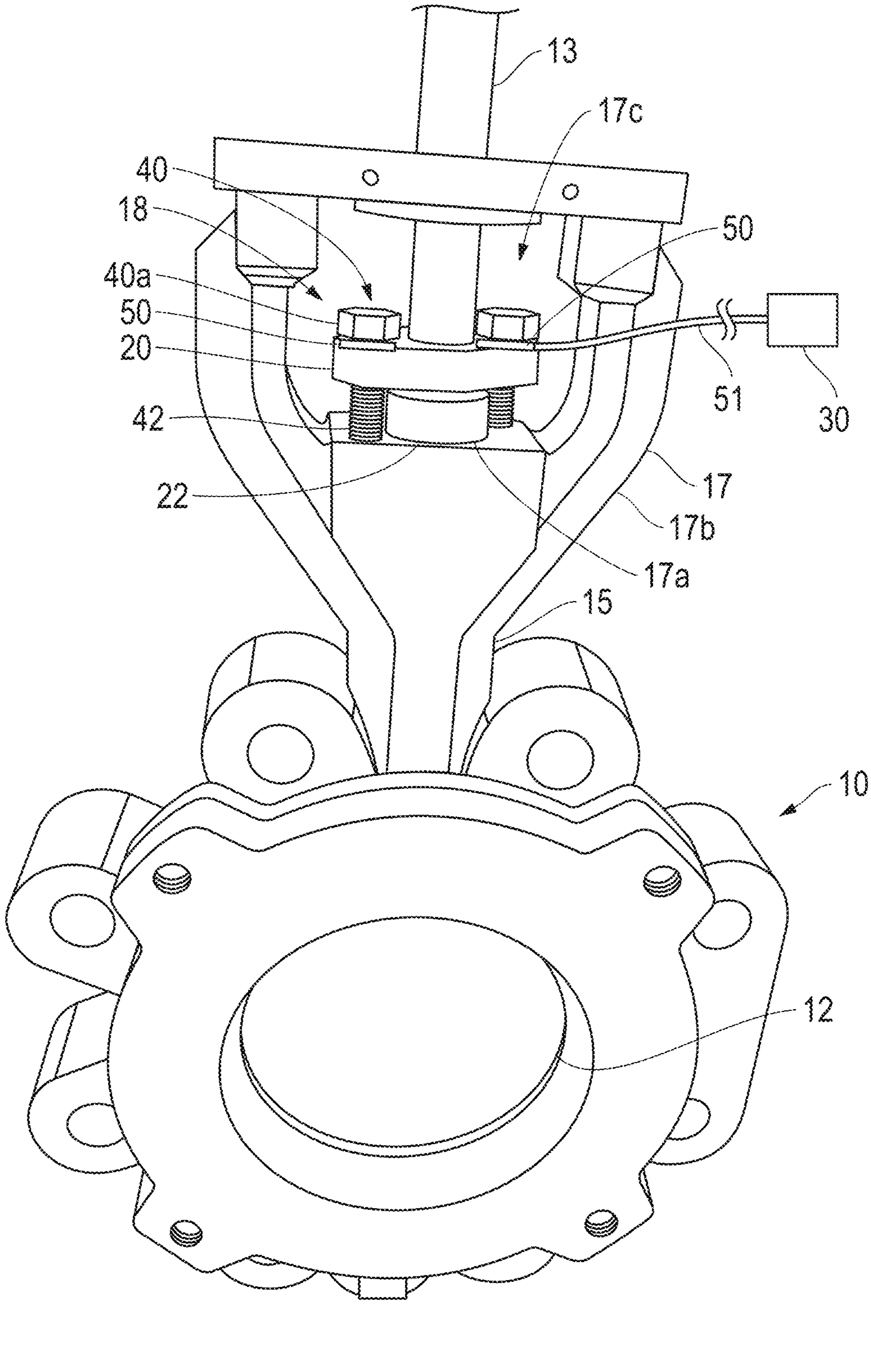
FIG. 2 depicts a front view of an alternative exemplary embodiment of a valve having one or more load cells.

FIG. 1 depicts a partially cut away view of an exemplary embodiment of a valve 10 having one or more load cells 50, wherein the valve 10 is connected to a mounting support 17 which houses the load cells 50. FIG. 2 depicts a front view of an alternative exemplary embodiment of a valve 10 having one or more load cells 50, wherein the valve 10 is unitary with a mounting support 17. The challenges when designing a valve apparatus or system 10 to monitor the desired key metrics which characterize the performance and wear of a control valve 10 include: the placement of the load cells 50, providing power and data to the load cells 50, and processing data 60 as received from the load cells 50. These same or similar problems also exist for the emissions sensor 80 for monitoring unwanted emissions or leaks from the valve 10. The valve system 10 may include a flow control element 12 set within a valve body 11. The control element 12 may be any kind of flow control element, such as by way of example only, and not to be limited to, a disk, a ball, a gate, and others. The valve 10 may control a media flow through the flow control element 12 with a valve stem 13 as actuated by an actuator (not depicted). The valve body 11 may have a neck 15 which extends away from the valve body 11. The valve neck 15 may be hollow and house the valve stem 13 which may rotatably maneuver the flow control element 12 set within the valve body 11. One or more packing elements 14, as can be seen in the partially cut-away view of FIG. 1, may be mounted near the top end of the neck 15, surrounding the valve stem 13. In exemplary embodiment of FIG. 1, at the opposite end of the body 11, the valve neck 15 may end in a flange 16 upon which a mounting support or housing 17 is mounted. The bottom of the mounting support 17 may be fastened to the flange 16 of neck 15 with one or more fasteners 18. In the alternative exemplary embodiment of FIG. 2, the neck 15 is unitary with the mounting support 17. The mounting support 17 may have walls or sides 17*b* that define mounting support openings 17*c*. In the exemplary embodiments as depicted, the interior of mounting support 17, housing the gland ring 22, gland retainer 20, load cells 50, and bolts/studs 40 and/or nuts 41 may be exposed and accessible to an operator of the valve 10 via openings 17*c*. In further alternative exemplary embodiments, the mounting support/housing 17 may be fully enclosed, without openings 17*c*, to prevent water and dirt ingress, or fully enclosed with other means of access (by way of example only, a door panel connected to the mounting support/housing 17 which may be opened or closed). The mounting support 17 may, in certain exemplary embodiments, be referred to as a bracket or housing 17. The stem 13 may extend through the ends of the mounting support 17 via top and bottom mounting support bores or outlets 17*a*. The gland ring 22, in certain exemplary embodiments, may be inserted or fitted within the bottom mounting support outlet 17*a*. The actuator (not illustrated) may engage the stem 13 at the free end of the stem 13 (opposite where the stem 13 is connected to the flow element 12), above the mounting support 17, and actuate or control the flow element 12 between an open and a closed position.

Figure 6:
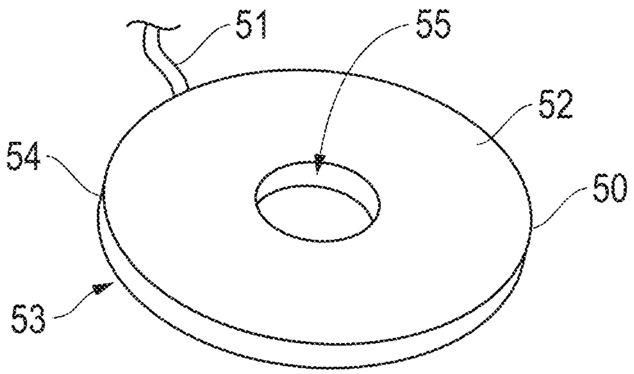
FIG. 6 depicts an isometric view of an exemplary embodiment of a load cell to be used with a valve.
Figure 7:
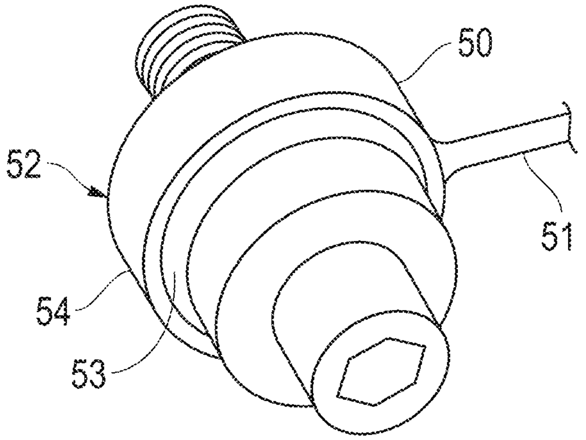
FIG. 7 depicts an isometric view of an alternative exemplary embodiment of a load cell to be used with a valve.
Figure 9:
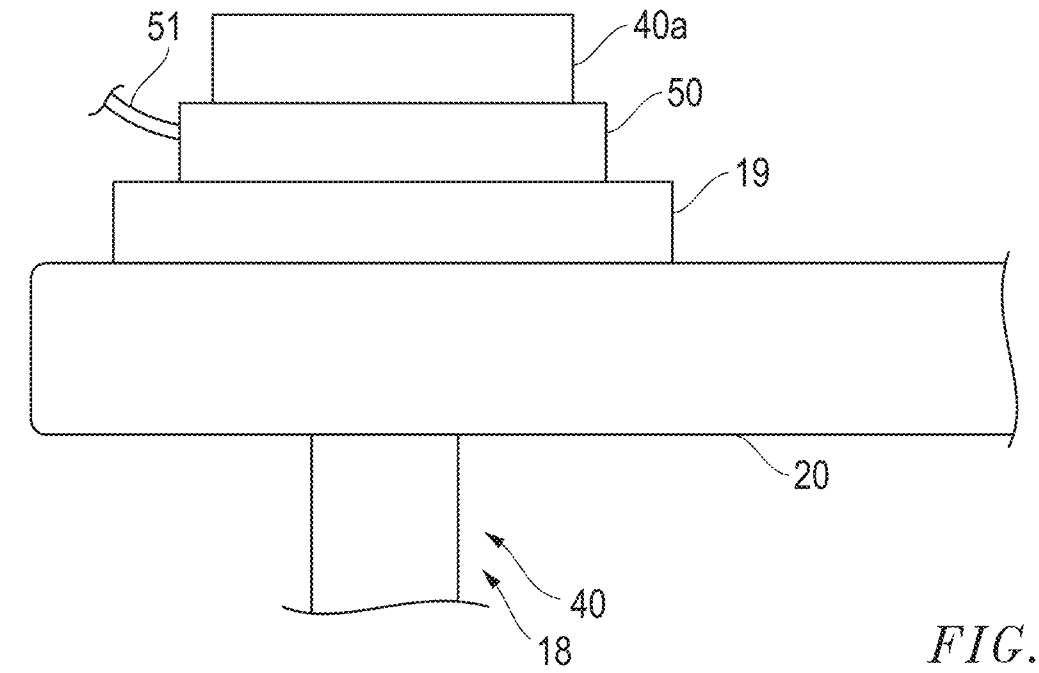
FIG. 9 depicts a schematic diagram of an enlarged view of the gland retainer and a load cell of the exemplary embodiment as shown in FIG. 2.
Figure 10:
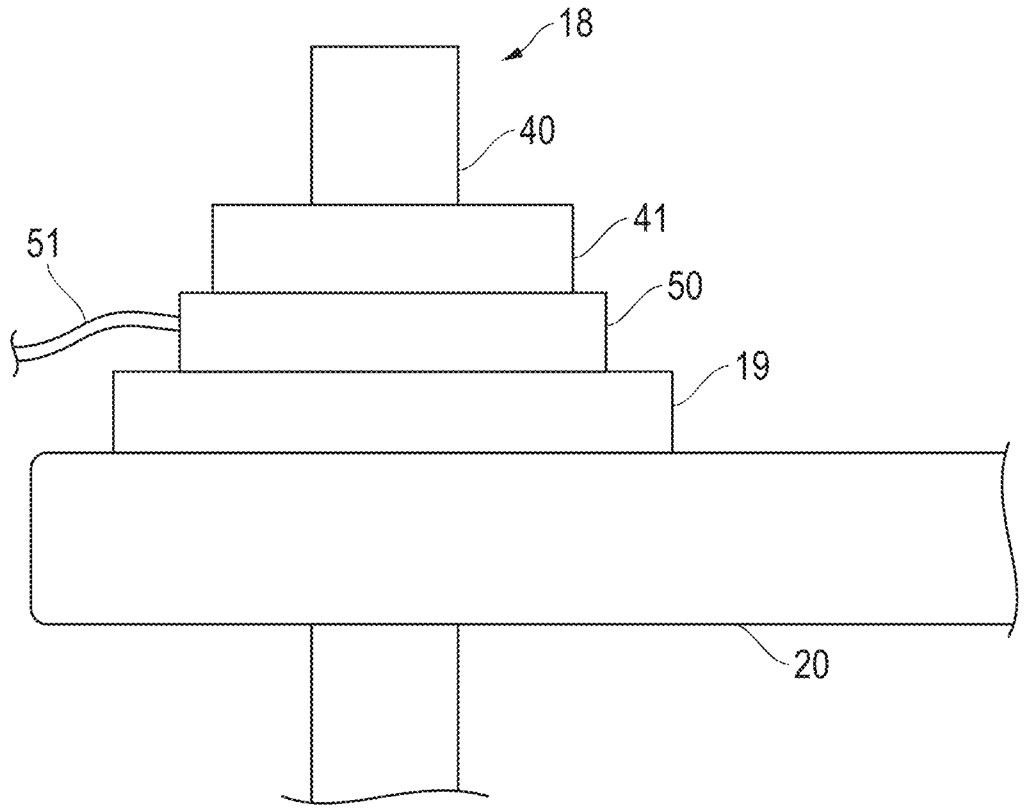
FIG. 10 depicts a schematic diagram of an enlarged view of the gland retainer and a load cell of the exemplary embodiment as shown in FIG. 1.

By way of example only, in the exemplary embodiments as shown in FIGS. 1 and 2, the disclosure proposes mounting one or more load cells 50 (such as, by way of example, the load cells, load washers, bolt sensors, or washer-type load cells 50 which are depicted in FIGS. 6-7) in the mounting support 17 above the valve body 11, and as described in further detail below. As shown in FIGS. 1-2, there may be four load cells 50, but in alternative exemplary embodiments, more or less load cells 50 may be installed as desired by the operator of the valve/valve system 10. Additional load cells 50 may provide multiple data points 60 of the sensed compression in each of the load cells 50 and when averaged, may provide a more accurate prediction of the actual compression forces being experienced by the stem 13 and packing elements 14. A gland ring 22 may be located within the mounting support 17, surrounding the stem 13 and located above the packing elements 14. The gland ring 22 may also be partially housed within the neck 15 or flange 16. A gland retainer 20 is mounted above the gland ring 22. The gland retainer 20 may be secured to the flange 16 (as illustrated in FIG. 1) via one or more fasteners 18. In FIG. 1, the fasteners 18 are nuts 41 engaged with bolts 40 on bolt threading 42. The load cells 50 in the exemplary embodiment of FIG. 1 are also threaded, inserted or otherwise mounted onto the bolts 40, as located beneath the nuts 41. The load cells 50 are compressed or clamped against the gland retainer 20 via the nuts 41. In certain exemplary embodiments, the load cells 50 may each have flat washers 19 adjacent to one or both of the surfaces 52,53 of the load cells 50, separating the load cell 50 from the fastener 18 (in FIG. 1, a nut 41) and/or gland retainer 20. The washers 19 may be any kind of washer as known to one of ordinary skill in the art, such as by way of example only, and not to be limited to, flat washers 19. The gland retainer 20, gland ring 22, studs/bolts 40, hex head nuts 41 and flat washers 19 (see e.g. FIG. 9-10), may be referred to as a whole as a stem packing system 70. This stem packing system 70 in the mounting support 17 may allow easy access to the operator for adjusting the hex head nuts 41 without requiring removal of the actuator via the mounting support opening 17*c*. The gland retainer 20, gland ring 22, studs/bolts 40, nuts 41, flat washers 19 and packing elements 14 may ensure that the compression, pressure, seal, force or "squeeze" is sufficient within the valve neck 15 to prevent fugitive valve emissions. The load cell 50 may monitor this compressive force, seal or pressure that is translated from the nuts 41 (or fasteners 18) to the packing 14 within the neck 15 as data 60. Over time and use of the valve 10, the compression, squeeze or seal within the valve neck 15 may decrease for various reasons (such as, by way of example only, stem 13 or packing element 14 wear or deterioration). The load cell 50 may detect this change in compression, seal, pressure, force or "squeeze" and transmit data 60 to a computing unit 30 for recordal and/or analysis accordingly. By way of example only, the reduction of the sensed/measured pressure or force of the load cell 50 may correspond with a predictable trend of valve 10 emissions leaking.

Additionally, the valve 10 may optionally include a leakage monitor or emissions sensor 80 as located above the packing elements 14, on the valve stem 13, or otherwise in close proximity to the packing 14 area, to detect fugitive emissions or media/gas/liquid/fluid leakage from the media flow controlled by control element 12. The emissions sensor 80 may also be in data communication with the microprocessor unit 30 (including the notification/alarm unit 35), with either a wire/cable connection or wirelessly. The emissions sensor 80 may be customized to detect the parts per million of a specific media; by way of example only, and not to be limited to, the emissions sensor 80 may be customized to detect hydrocarbon emissions, methane, or volatile organic compounds (VOC) emissions from the media flow. Detection of other emissions by the emissions sensor 80 as desired by the operator of the valve system 10 is considered to be encompassed within this disclosure. An emissions sensor or detector could also be mounted outside but in the area of the valve 10 or valve body 11.

In the alternative exemplary embodiment of FIG. 2, the gland retainer 20 is secured to the valve neck 15 and body 11 via fasteners 18. In the embodiment as illustrated in FIG. 2, the fasteners 18 are threaded bolts 40 having bolt heads 40*a*. Load cells 50 are located beneath the bolt heads 40*a* and above the gland retainer 20. In certain exemplary embodiments, the load cells 50 may each include flat washers 19 adjacent to one or both of the surfaces 52,53 of the load cells 50, which separate the load cell 50 from the fastener 18 (in FIG. 2, e.g. the bolt head 40*a*) and/or gland retainer 20. The bolt heads 40*a* clamp, compress or tighten the load cells 50 against the gland retainer 20 in the alternative exemplary embodiment of FIG. 2. Although the fasteners 18 in FIG. 1-2 are illustrated as nuts 41 and bolts 40 with threading 42, any kind of fastener 18 as known in the art is considered within the scope of the disclosure, so long as fasteners 18 are capable of adjustably tightening, squeezing or compressing the load cells 50 against the top of the gland retainer 20, and also loosening, releasing or relieving the same compressive force or pressure against the load cells 50.

As illustrated in FIG. 2, the load cells 50 may have a wire or cable connection 51 which allows the communication of data 60 to and from a computing device, microcontroller or microprocessor 30. In alternative embodiments, such as shown in FIG. 1, the load cell 50 may communicate to a microcontroller 30 wirelessly. One or more flat washers 19

Figure 5:
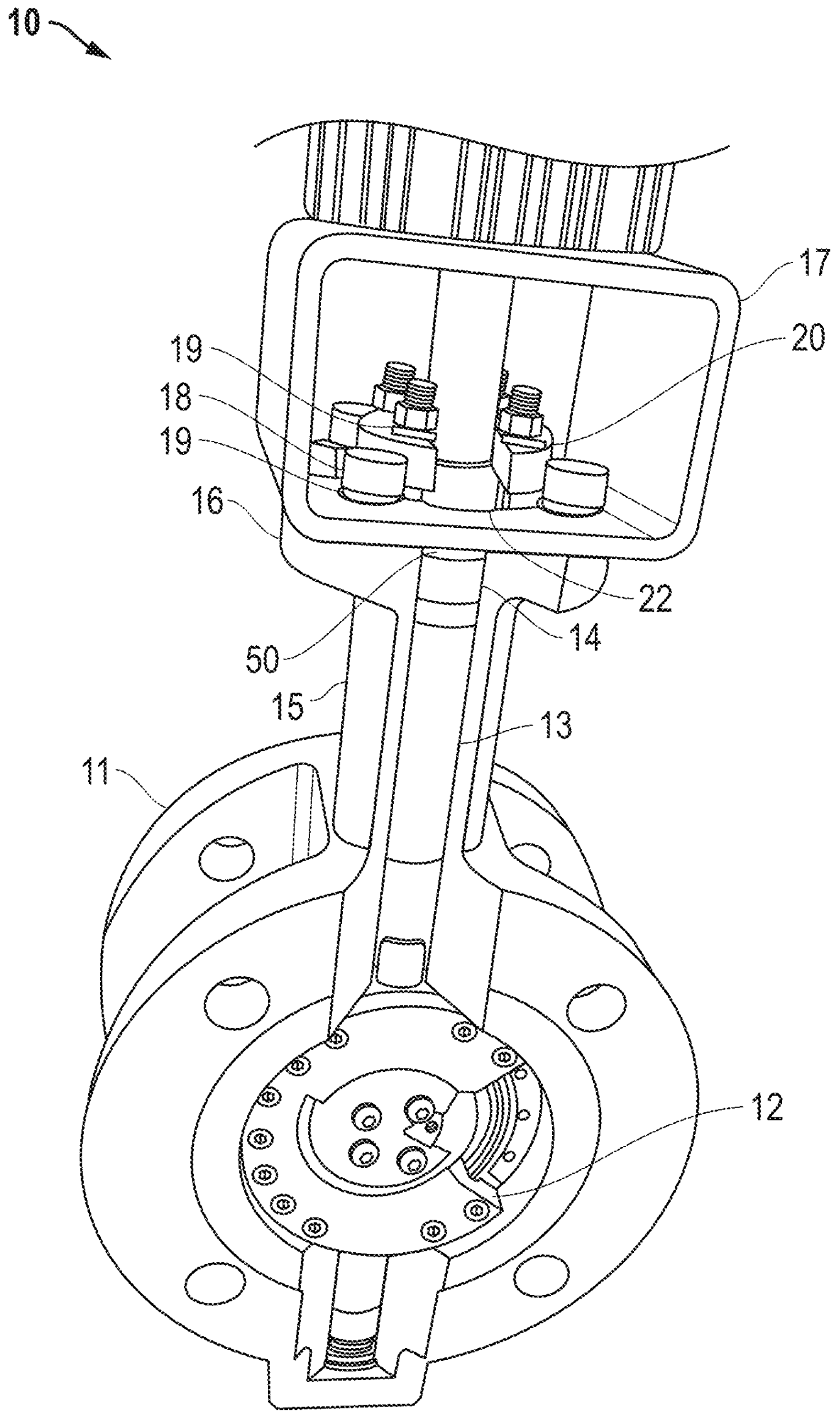
FIG. 5 depicts a partially cut away view of an alternative exemplary embodiment of a valve having one or more load cells located adjacent to the packing elements.

(as illustrated in the schematic diagram in FIG. 9-10) may optionally be mounted on the bolt 40 between the load cell 50 and gland retainer 20; or alternatively, one or more washers (not illustrated) may optionally be mounted on the bolt 40 between the nut 41/bolt head 40*a* and the load cell 50. Washers 19 may be included directly adjacent to the top surface 52 of the load cell 50, directly adjacent to the bottom surface 53 of the load cell 50, or adjacent to both sides/surfaces of the load cell 50 as desired. In the alternative exemplary embodiment as depicted in FIG. 5, one or more load cells 50 may be mounted on top of or beneath the packing elements 14, within the valve neck 15. The packing elements 14 may provide constant compression for a positive seal around the stem 13. The packing 14 may optionally include polytetrafluoroethylene (PTFE) or Teflon packing, carbon fiber anti-extrusion rings, and/or flexible graphite rings, amongst others. In certain embodiments, the packing elements 14 may include five such rings of packing material. The load cell 50 in the alternative exemplary embodiment of FIG. 5 may also have a wire/cable connection 51 (not illustrated in FIG. 5), or may optionally communicate data 60 wirelessly.

Load cells 50, as further depicted in FIG. 6-7 may in certain exemplary embodiments be a load washer, bolt sensor, washer type load cell, wherein the load cell 50 has a substantially cylindrical shape, with a first circular flat surface 52 and a second circular flat surface 53 and a cylindrical wall 54 connecting the two surfaces 52, 53. There may be an opening 55 in the center of the load cell 50, wherein the load cell 50 may be mounted, secured or engaged onto a bolt 40 or other types of fastener 18 via said opening 55. The load cells 50 may be commercially available conventional load cells sold under the following brands, including, but not limited to: OMEGA brand load washers, or OMEGA brand bolt force sensors, and others. The load cells 50 may measure compressive or clamping force between the top and bottom surfaces 52,53 and transmit the sensed force data 60 to the microcontroller 30. The sensed compressive force data or signal 60 corresponds to the force being translated into and applied to the stem 13 and packing elements 14 and represents the packing integrity and stem seal integrity of a valve 10. The data 60 may be continuously monitored by and stored within microcontroller 30. The data 60 regarding the sensed conditions, as monitored and tracked over time, may indicate and alert the operator as to potential problems of the valve 10, such as emissions leakage, stem 13 wear or stem 13 damage. In addition, although the valve 10 is depicted in both FIG. 1-2 as having two load cells 50 in each figure, any number of load cells 50 may be attached or fastened to the gland retainer 20 to sense and transmit the data 60.

Regarding the load cell 50, each load cell 50 may sense, record, measure or obtain and transmit a measurement, signal, metric or data 60 which reflects the force, compression or pressure between or across the two surfaces 52,53 of the load cell 50. The data 60 of the load cell 50 reflects the packing integrity of the packing 14, stem-seal integrity, and stem 13 wear and/or deterioration and may also indicate or predict potential existing or future emission leaks from the valve 10. Monitoring and tracking this data 60 helps to achieve and maintain low fugitive emissions from the valve 10. The load cells 50 may contain or be manufactured with strain gauges and/or piezoelectric technology (not illustrated), as is known to one of ordinary skill in the art. The data or signals 60 may be further processed and analyzed by the microprocessor or computing unit 30 to provide predictive modeling or analysis, or to determine desired parameters for the valve system 10 as further described for FIG. 8.

Figure 8:
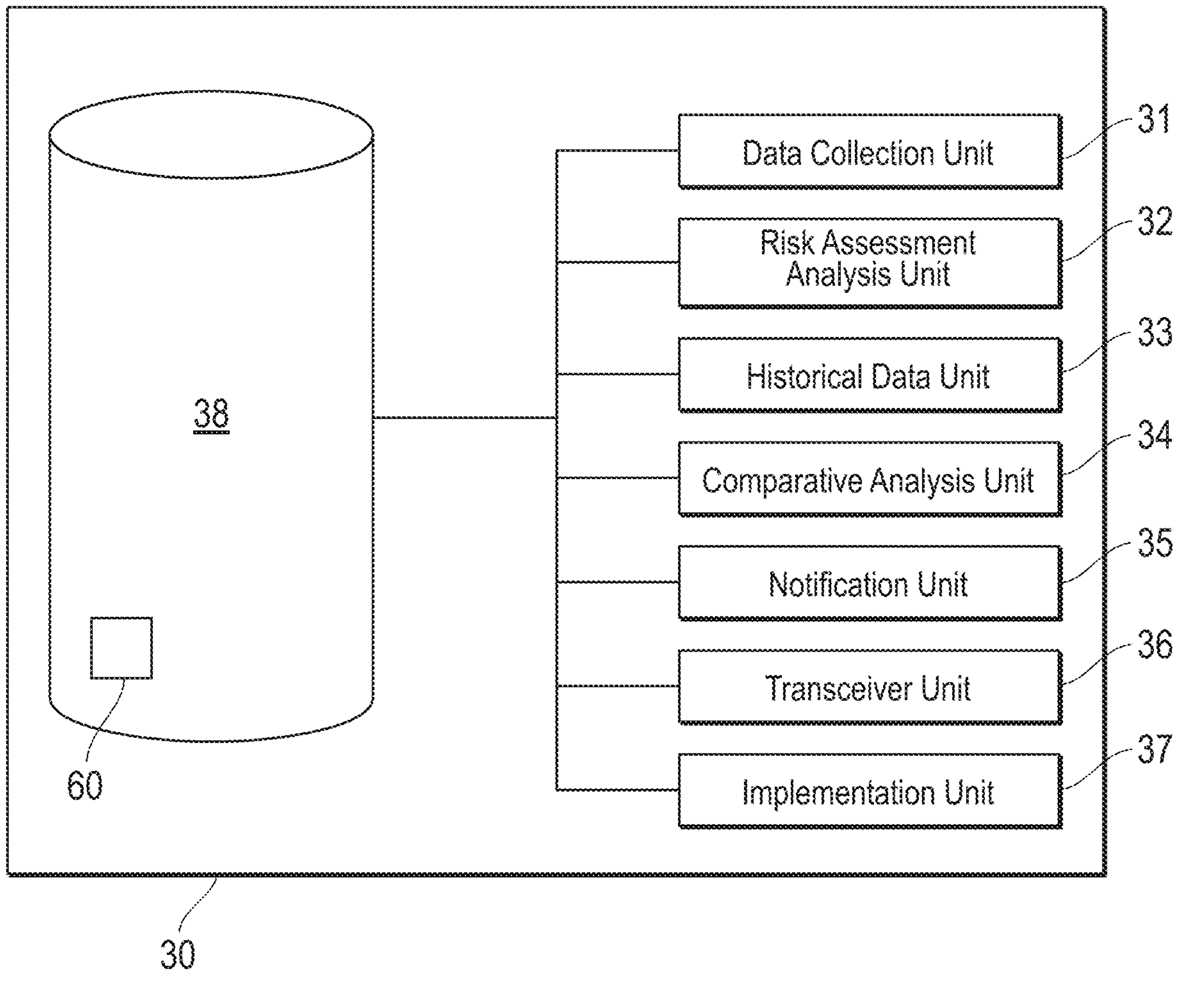
FIG. 8 depicts a schematic diagram of an exemplary embodiment of a microcontroller or microprocessor for a valve with one or more load cells.

FIG. 8 depicts a schematic diagram of an exemplary embodiment of a microcontroller or microprocessor 30 for the valve 10. The microprocessor, microcontroller or computing unit 30 may have components including, but not limited to, a storage device 38, a data collection unit 31, a risk assessment or analysis unit 32, a historical data unit 33, a comparative analysis unit 34, a notification or alarm unit 35, and a transceiver unit 36. Generally, any description or disclosure regarding analysis and processing based on load cell sensor 50 retrieved/observed data, measurements or metrics 60 that is described as performed by the microprocessor 30 may also be performed by remotely or within a computing unit of the actuator of the valve 10. The microprocessor 30, as depicted, may be located separately from the valve 10, as connected via cable or wire connection 51. However, in alternative exemplary embodiments, the microprocessor 30 may be located on or in the body 11 of the valve 10, or in the actuator of valve 10. The microprocessor 30 may also be wireless and receiving and transmitting data to and from valve 10 and its sensors (including load cell 50 and emissions sensor 80) without a cable connection 51.

The microprocessor 30 and its components are generally implemented as electronic circuitry and processor-based computational components controlled by computer instructions stored in physical data storage components 38, including various types of electronic memory and/or mass-storage devices. It should be noted, at the onset, that computer instructions stored in physical data storage devices 38 and executed within processors or microcontrollers 30 comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data storage devices 38. Similarly, computer-readable media are physical data storage media 38, such as disks, memories, and mass-storage devices that store data in a tangible, physical form that can be subsequently retrieved from the physical data storage media 38. Moreover, the physical data storage media 38 may optionally be integral with the microprocessor 30.

The microprocessor 30 accesses and uses a variety of different types of stored or received information, signals, feedback, data, metrics, measurements or inputs 60, including, user/operator input, in order to generate output controls or commands that may trigger or change processes of the microprocessor 30 or the valve 10, or otherwise transmit signals and data. Such changed processes may include: disabling power to the actuator or valve 10; changing the position of the control element 12; and visual and audible alerts or alarms to the operator of the process system, amongst others. The data 60 may be collected and analyzed both singularly and collectively to determine faults, predicted faults, comparison to base line readings, and others using statistical models such as Bayesian decision making and fine analysis of raw data 60 using Fast Fourier Transforms (hereinafter, also "FFT"). The computations may be distributed between the microprocessors 30 and other computing units or electronics within the actuator, valve 10 or remotely. Received/measured variables, data, measurements or metrics 60, or input/stored variables, metrics, information or data 60, whether received to the microprocessor 30 by user-input or feedback from any of the load cells 50 or emissions sensor 80, includes at least the sensed or threshold/limit axial pressure, force or compression data 60, presence of emission data 60 as well as other sensors that may be monitoring aspects of the valve 10. Additional information used by the microprocessor 30 in its algorithms may include one or more stored control schedules, algorithms, immediate control inputs received through a control or display interface, and data, commands, commissioning, and other information received from other processing systems (including the data communication between other computing units), remote data-processing systems, including cloud-based data-processing systems (not illustrated) and may further include statistical analysis of mean, deviation, deviation of baseline, Bayesian, and FFT (including other analyses) of data 60. Further, in alternative exemplary embodiments, the microprocessor 30 may monitor and coordinate data feedback and/or input 60 for the valve 10 or to alert an operator of maintenance or repair needs as based on the measurements/metrics 60 (including emissions data 60) or saved/stored data 60 for the valve 10. Analog and digital interfaces of the microcontroller 30 may process the load cell data 60 and perform real-time analysis of the collected data 60. The microprocessor 30 can extract and deduce from the raw real-time sensor data 60 information or predictions regarding (and not limited to): remaining stem 13 life, remaining packing element 14 life, potential fugitive emissions from the valve 10, service intervals, potential pending failure or loss of service, and preventative maintenance. By way of example only, the microprocessor 30 may monitor and record the compression or axial force across the load cell 50 surfaces 52,53 data 60 over several periods of time into the physical data storage component 38, and adjust the position of the fasteners 18 accordingly to account for wear/deterioration of the packing 14 or stem 13 for a necessary control element 12 flow volume or amount; or manipulate the valve 10 via an actuator as needed to minimize fugitive valve emissions data 60 over a threshold level; and/or alert the operator when the sensed data or metric 60 exceeds a stored desired data value or set of parameters, range or threshold for the corresponding sensed data 60. This history and data 60 stored by the physical data storage component 38 may be further used to troubleshoot, maintain, and repair the components (such as the stem 13, packing 14, load cell 50, emissions sensor 80, washers 19, gland retainer 20, gland ring 22 or fasteners 18) of the valve 10 by the operator or manufacturer of the system, or by the microprocessor 30 itself. In addition to optionally generating control output to manipulate the components of the valve 10 (by way of example only, the actuator and the control element 12), the microprocessor 30 may optionally also provide a LED, graphic, display or analog interface (including a digital or analog interface or alarm system) that allows users/operators to easily input controls and may also provide or transmit output, data, signals and other information to remote entities, other microcontrollers, and to users through an information-output interface. The interface system may be an actuator mounted electronics having the ability to display information and in-turn communicate further information to a process controller or other instrumentation connected to a network for actuator, including, but not limited to, cloud-based network and storage. Digital communication may allow the electronics or computing units within the actuator to directly communicate with the microprocessor unit 30. In this manner, the microprocessor 30 may act as a mechanism to sense or receive feedback to adjust and correct the valve 10 system(s).

Embodiments of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the disclosed subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium; optical storage medium; magneto-optical storage medium; read only memory; random access memory; erasable programmable memory; flash memory; or other types of medium suitable for storing electronic instructions. In addition, the various embodiments may be embodied in an electrical, optical, acoustical or other form of propagated signal (e.g., carrier waves, infrared signals, digital signals, etc.), or wire line, wireless, or other communications/telemetry medium.

Computer program code for carrying out operations of the embodiments may be written in any combination of one or more programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

The storage device 38 may be any suitable storage device for storing data. The data collection unit 31 may collect, gather, manipulate, and/or categorize the data 60 transmitted by the load cell 50 or emissions sensor 80 about the valve 10. If using multiple load cells 50, each load cell 50 may contribute metrics or data 60 which lead to a partial view of the underlying valve 10 condition regarding the valve stem 13 and valve packing elements 14. When combining the metrics 60 of a group of load cells 50 and/or emissions sensor 80 using real-time analytical techniques, an accurate evaluation of the valve 10 and actuator condition may be obtained. The data collection unit 31 may manipulate the collected data into a format that allows the operator and/or the microprocessor 30 to take appropriate action during the operations. The risk assessment or analysis unit 32 may receive the categorized data 60 from the data collection unit 31 in order to determine if there is any present or future risk likely at the valve 10 and may make predictions not limited to remaining valve 10 life, remaining actuator life, remaining stem 13 life, remaining packing element 14 life, potential trend of fugitive emissions from the valve 10, service intervals, potential pending failure or loss of service, and preventative maintenance. The risk may be based on real time events that are taking place in the operations and/or based on predictive events that are likely to occur. The risk assessment or analysis unit 33 may classify the risks for the microprocessor 30 and/or the operator (such as whether to create an alert or alarm). By way of example only, the operator can input a threshold limit or range of the force or pressure sensed by the load cell(s) 50, which, if the sensed pressure/compression metrics 60 falls below the input or desired threshold, can be directly correlated to packing integrity and stem-seal integrity, which can be identified by the microprocessor 30 via the risk assessment analysis unit 32 or other components of the microprocessor 30 (such as the comparative analysis unit 34). Additionally, the operator can input a threshold limit or range of emissions allowable for the emissions sensor 80, and which if the threshold limit or range is overcome by the sensed emission data 60, can be identified by the microprocessor 30 via the risk assessment analysis unit 32 or other components of the microprocessor 30 (such as the comparative analysis unit 34) and issue an alarm via notification unit 35 or to adjust or tighten the fasteners 18 (bolts/studs 40 and/or hex nuts 41) or to close the valve 10 from permitting additional media flow.

The historical data unit 33 may categorize the historical data, measurements or metrics 60 collected by the data collection unit 31. The comparative analysis unit 34 may compare the data, measurements or metrics 60 collected by the data collection unit 31, the classified risks, and/or the historical data 60 in order to determine a course of action for the operator and/or microprocessor 30. The comparative analysis unit 34 may further determine if the sensed metrics, data or measurements 60 is within a predetermined set of parameter values as previously input into the microprocessor 30. The valve 10 parameters for the load cell 50, emissions sensor 80 (and any other sensors) may be any suitable parameters set by the manufacturer, operator, the client, or any other suitable source or algorithm. The comparative analysis unit 34 may make a determination of how serious the risk is based on the data 60 sensed and collected. The comparative analysis unit 34 may relay information to the notification unit 35 so that the notification unit 35 may alert the operator and/or take action. The notification unit 35 may alert the operator or microprocessor 30 of the real time condition, and/or a predicted condition about the valve system 10. The notification unit 35 may include visual display interface(s), audible sounds or alarms, a kinetic or automated response, and/or a combination thereof. The transceiver unit 36 and/or the transmitter may be any suitable device configured to send and/or receive data to the microprocessor 30 (such as, by way of example, in certain exemplary embodiments, wires or cables 51). The implementation unit 37 may be configured create and execute an implementation plan for remediation of the valve 10 (including, but not limited to disabling or enabling power to the actuator or valve 10; adjusting the fasteners 18 on which load cells 50 may be connected; adjusting the actuator or valve 10, changing the position of the control element 12; and visual and audible alerts or alarms to the operator of the process system, amongst others). In another example, the operator and/or the microprocessor 30 may update, determine or provide predictions as to the valve 10 parameters, and/or data as operations are being performed. The operator and/or the microprocessor 30 could notify or update the historical data unit 33 of any conditions, or parameters, that need to be compared in the future.

Figure 3:
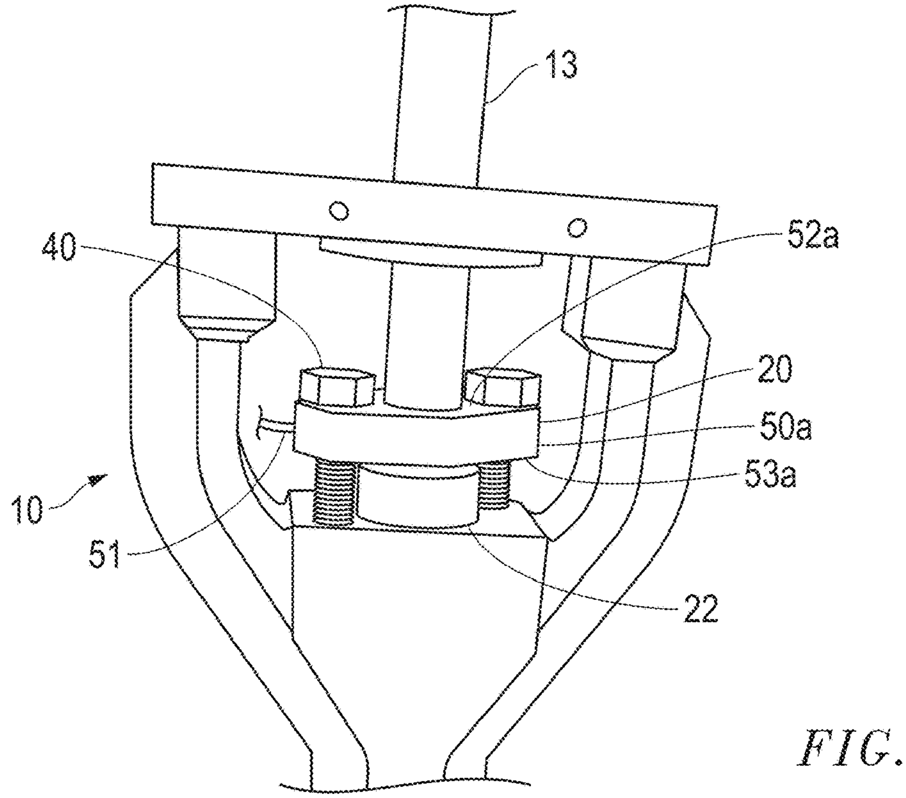
FIG. 3 depicts a front view of an alternative exemplary embodiment of a valve having a gland retainer load cell.
Figure 4:
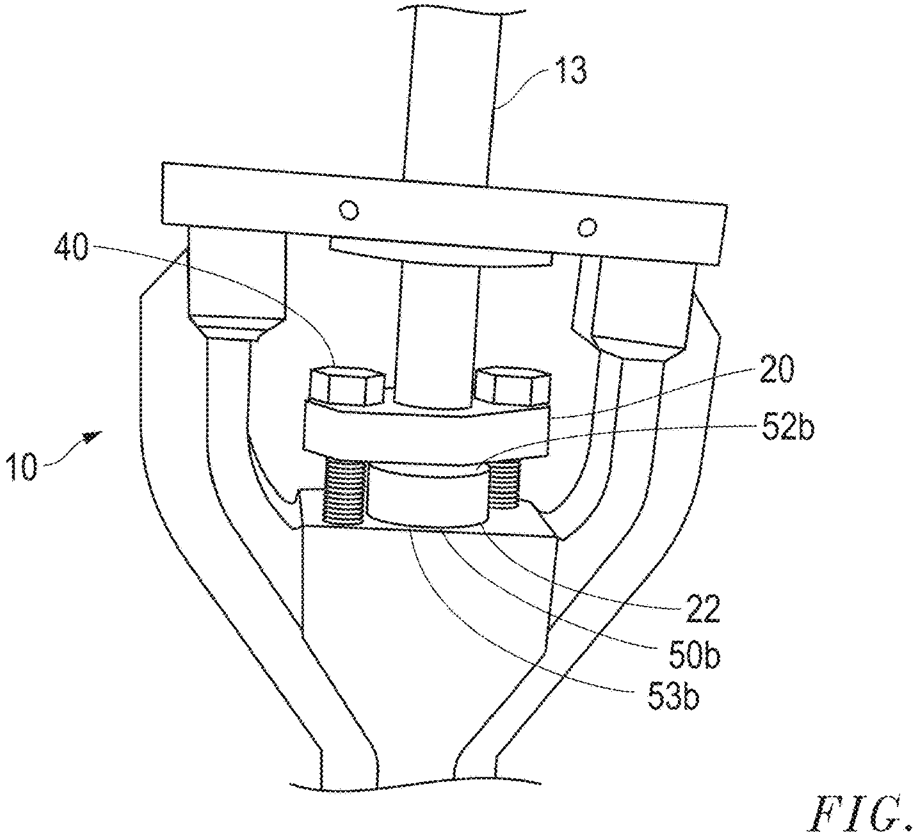
FIG. 4 depicts a front view of an alternative exemplary embodiment of a valve having a gland ring load cell.

In further alternative exemplary embodiments as depicted in FIG. 3, the valve 10 may have a gland retainer load cell 50*a* which performs the function of a gland retainer 20 and a compressive pressure sensing load cell 50. In the further alternative exemplary embodiments as depicted in FIG. 4, the valve 10 may have a gland ring load cell 50*b* which performs the function of a gland ring 22 and a compression pressure sensing load cell 50. In FIG. 3, the gland retainer 20 is also a load cell 50*a* which is capable of monitoring pressure or compression across the two flat planes or surfaces of the top 52a and bottom 53*a* of the gland retainer load cell 50*a*. In FIG. 4, the gland ring 22 also a load cell 50*b* which is capable of monitoring pressure or compression across the two flat planes or surfaces of the top 52b and bottom 53*b* of the gland ring load cell 50*b*. The load cells 50*a*, 50*b* may perform as substantially similar as described above for load cells 50 of FIGS. 6-7 and communicate substantially similarly to a microprocessor 30 via a connection 51 (or wirelessly). The bolts 40 along with bolt heads 40*a* (or nuts 41) may be adjusted as needed by the operator or micro-processing unit, to achieve the desired pressure or compression across the load cell 50*a*,50*b*.

While butterfly valves have been illustrated as exemplary embodiments, any type of industrial, control or process valve may be implemented as the valve apparatus 10.

While the exemplary embodiments are described with reference to various implementations and exploitations, it will be understood that these exemplary embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for preserving the integrity of a packing and the integrity a stem of a valve, comprising the steps of:

providing a gland ring mounted above the packing surrounding the stem;

providing a gland retainer mounted above the gland ring, wherein the gland retainer is secured to the valve with one or more fasteners, wherein the gland retainer is a strain gauge load cell;

directly sensing a mechanical compressional force between a top surface and a bottom surface of the gland retainer via the strain gauge load cell;

converting the sensed each compressional force into a data point;

transmitting the data point to a computing unit.

2. The method according to claim 1, further comprising the step of comparing the data point with a threshold range.

3. The method according to claim 2, further comprising the step of notifying an operator of the valve with an alarm if the data point is outside a limit of the threshold range.

4. The method according to claim 3, further comprising the steps of detecting fugitive emissions with an emissions sensor connected to the valve; and notifying the operator of the valve with the alarm if fugitive emissions are detected.

5. The method according to claim 3, further comprising the step of recording the data point over time and predicting a condition of the stem and the packing.

6. The method according to claim 5, further comprising the step of adjusting the one or more fasteners to achieve a desired compression across the strain gauge load cell.

7. The method according to claim 1, wherein the strain gauge load cell comprises at least two strain gauge load cells, and further comprising the step of averaging the data points.

8. The method according to claim 1, further comprising one or more cables connected at a first end of the cable to the strain gauge load cell, wherein each cable is configured to transmit data and power to the strain gauge load cell, and further wherein each cable is connected at a second end to the computing unit or wireless transmission device.

9. The method according to claim 8, further comprises further comprising the steps of:

receiving the data point regarding the valve from the strain gauge load cell;

evaluating a condition of the valve based on the received data point; and compiling the received data points over time.

10. The method according to claim 9, further comprising the steps of comparing the received data points, determining or predicting via analysis and responsive to the received data points, the condition of the valve based on the received data point, a generated report detailing actual failure, a likelihood of a failure and/or a probability of future failure or need for service.

11. The method according to claim 10, further comprising the steps of creating and executing an implementation plan for remediation of the valve.

* * * * *